US012083479B2

(12) United States Patent
Ersando et al.

(10) Patent No.: US 12,083,479 B2
(45) Date of Patent: Sep. 10, 2024

(54) FILTER CARTRIDGE, APPARATUS, AND METHODS

(71) Applicant: ENTEGRIS, INC., Billerica, MA (US)

(72) Inventors: Jean Camille L. Ersando, Manchester, NH (US); Barry Lee Gregerson, Deephaven, MN (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/732,472

(22) Filed: Apr. 28, 2022

(65) Prior Publication Data

US 2022/0347631 A1 Nov. 3, 2022

Related U.S. Application Data

(60) Provisional application No. 63/182,621, filed on Apr. 30, 2021.

(51) Int. Cl.
*B01D 29/11* (2006.01)
*B01D 63/06* (2006.01)

(52) U.S. Cl.
CPC ........ *B01D 63/063* (2013.01); *B01D 2313/20* (2013.01); *B01D 2313/44* (2013.01)

(58) Field of Classification Search
CPC .......... B01D 2313/08; B01D 2313/086; B01D 2313/20; B01D 2313/44; B01D 61/02; B01D 61/14; B01D 61/06; B01D 61/063; B01D 61/067; B01D 2239/0654; B01D 2239/0695; B01D 2275/105; B01D 29/012; B01D 29/035; B01D 46/0031; B01D 46/2411; B01D 46/523; B01D 27/00; B01D 27/04; B01D 27/06; B01D 27/08; B01D 35/00; B01D 35/30; B01D 35/301; B01D 35/308; B01D 46/00; B01D 46/0002; B01D 46/0005; B01D 46/0016; B01D 2201/30; B01D 2201/301; B01D 2201/307; B01D 2201/04; B01D 2201/0407; B01D 2201/0415; B01D 2201/0423; B01D 29/05; B01D 29/13
See application file for complete search history.

(56) References Cited

U.S. PATENT DOCUMENTS

| | | | |
|---|---|---|---|
| 3,747,770 A | * | 7/1973 | Zentis ................... B01D 33/50 |
| | | | 210/402 |
| 3,815,754 A | | 6/1974 | Rosenberg |
| D270,947 S | | 10/1983 | Mehra et al. |
| 4,706,663 A | | 11/1987 | Makey |
| D317,201 S | | 5/1991 | Sone |
| D332,802 S | | 1/1993 | Greenhut |
| D343,682 S | | 1/1994 | Cattaoris et al. |
| D358,213 S | | 5/1995 | Sutton et al. |
| 5,490,926 A | * | 2/1996 | Hammeken ............ B01D 63/10 |
| | | | 210/321.74 |
| D382,963 S | | 8/1997 | Didier |

(Continued)

FOREIGN PATENT DOCUMENTS

| CN | 202087112 U | 12/2011 |
|---|---|---|
| CN | 103657235 B | 8/2016 |

(Continued)

*Primary Examiner* — Allison G Fitzsimmons

(57) ABSTRACT

Described are filter cartridges, filter apparatuses, and related methods that involve a filter cartridge that includes a cartridge support that includes centering surfaces, a helical strand, or both.

15 Claims, 7 Drawing Sheets

(56) References Cited

U.S. PATENT DOCUMENTS

| | | |
|---|---|---|
| 5,690,765 A | 11/1997 | Stoyell |
| 6,110,368 A | 8/2000 | Hopkins |
| 6,110,369 A | 8/2000 | Ditter |
| D475,461 S | 6/2003 | Takagi et al. |
| D476,058 S | 6/2003 | Norton |
| D589,873 S | 4/2009 | Banks |
| D636,878 S | 4/2011 | Lee |
| D646,350 S | 10/2011 | Salvador et al. |
| D646,750 S | 10/2011 | Salvador et al. |
| D719,374 S | 12/2014 | Myron |
| D739,162 S | 9/2015 | Jorgensen |
| D786,507 S | 5/2017 | Goodman et al. |
| D815,714 S | 4/2018 | Bell et al. |
| D880,895 S | 4/2020 | Wang |
| D901,240 S | 11/2020 | Armistead et al. |
| D932,015 S | 9/2021 | Frank et al. |
| 2002/0148773 A1* | 10/2002 | Mellwig ................ B01D 29/21 210/485 |
| 2003/0155293 A1 | 8/2003 | McGrath |
| 2006/0086075 A1 | 4/2006 | Scott et al. |
| 2006/0231483 A1 | 10/2006 | Malgorn et al. |
| 2009/0049814 A1* | 2/2009 | Baseotto ............ B01D 46/0002 55/482 |
| 2015/0375143 A1 | 12/2015 | Kathan et al. |

FOREIGN PATENT DOCUMENTS

| | | |
|---|---|---|
| CN | 305480160 S | 12/2019 |
| CN | 305541876 S | 1/2020 |
| CN | 305755422 S | 5/2020 |
| CN | 306131452 S | 10/2020 |
| CN | 306316004 S | 2/2021 |
| CN | 306316005 S | 2/2021 |
| CN | 306370225 S | 3/2021 |
| CN | 306463229 S | 4/2021 |
| KR | 20190010090 A | 1/2019 |
| TW | 253684 | 8/1995 |
| TW | D197703 | 5/2019 |
| TW | 202027841 A | 8/2020 |
| WO | 2007009040 A1 | 1/2007 |

\* cited by examiner

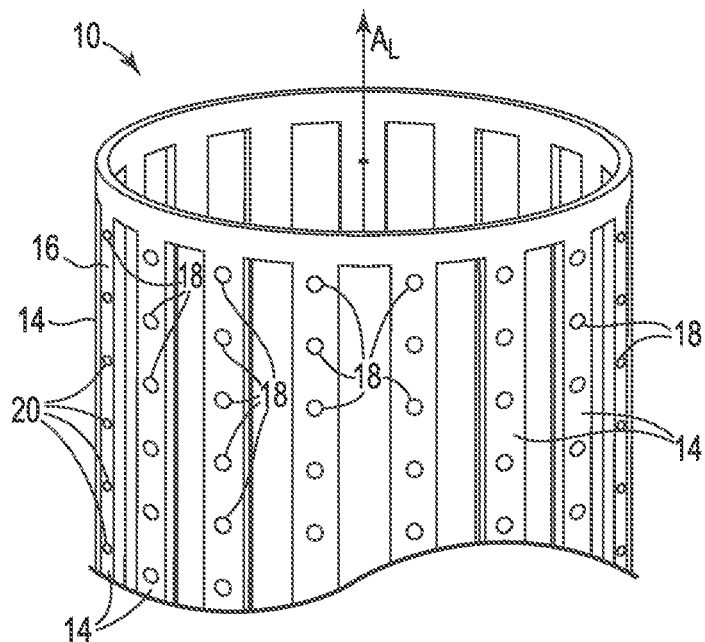
Fig. 1A
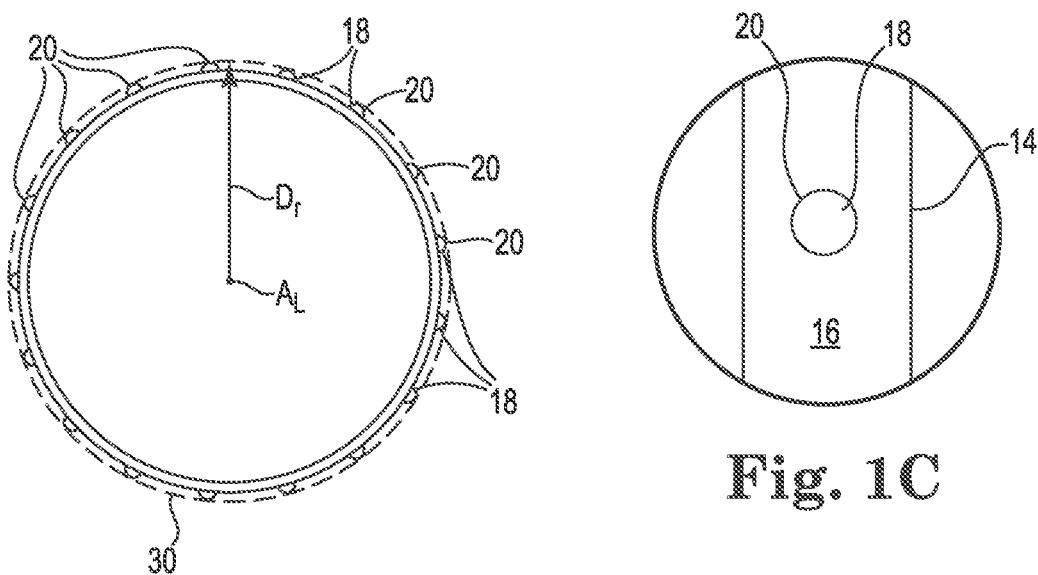
Fig. 1B
Fig. 1C

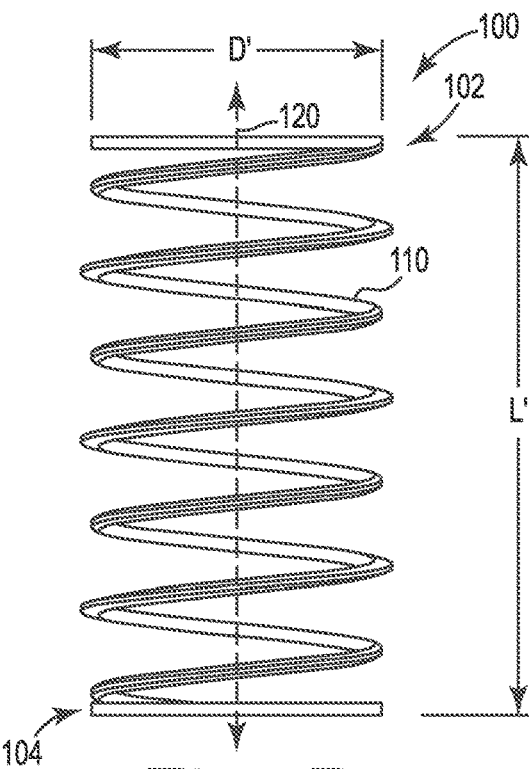
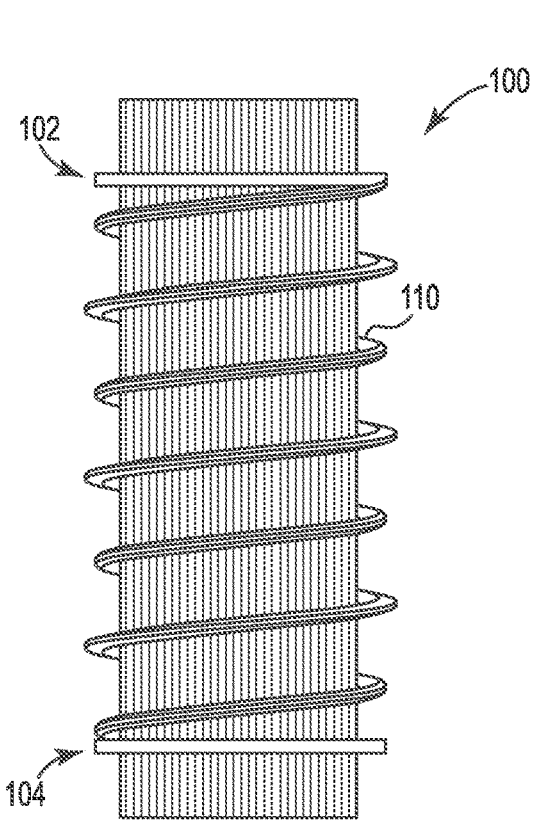 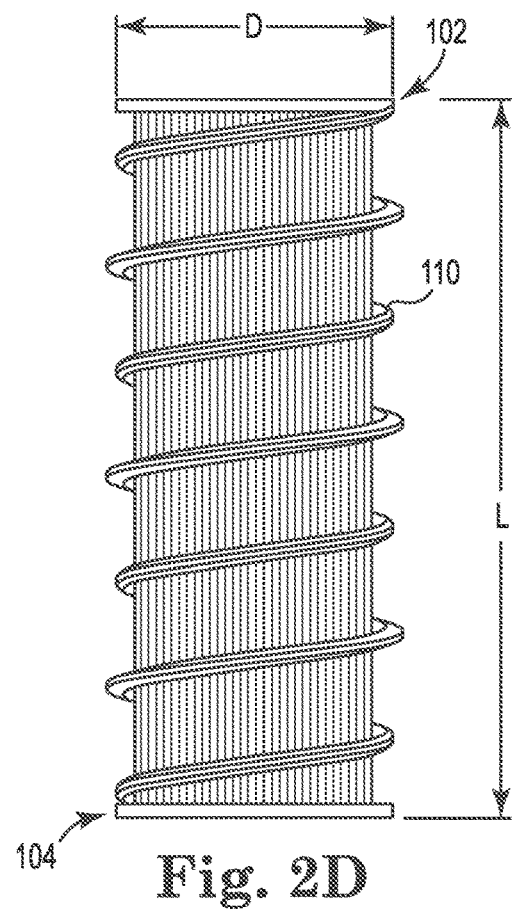
Fig. 2B
Fig. 2C  Fig. 2D

FILTER CARTRIDGE, APPARATUS, AND METHODS

CROSS-REFERENCE TO RELATED APPLICATIONS

This application claims the benefit under 35 USC 119 of U.S. Provisional Patent Application No. 63/182,621 filed Apr. 30, 2021, the disclosure of which is hereby incorporated herein by reference in its entirety.

FIELD

The disclosure relates to filter cartridges, filter apparatuses, and related methods that involve a filter cartridge that includes a cartridge support that includes centering surfaces, a helical strand, or both.

BACKGROUND

Liquid and gas filtration systems allow for the preparation and control of flows of purified fluids. These systems have a broad range of uses, including uses in chemical processing and manufacturing industries e.g., for pharmaceuticals, food processing and packaging, industrial and commercial chemicals and chemical products, and for processing liquids that are used for manufacturing semiconductor and microelectronic devices. For semiconductor and microelectronic device processing, liquid filtration systems are used for filtering liquids used to manufacture solar panels, flat panel displays, microprocessors, memory products, hard disk drive components, and other semiconductor and microelectronic devices. The liquids may be used in a process such as photolithography, bulk chemical delivery, chemical mechanical processing (CMP), wet etching, or cleaning, among other types of processes.

Various designs of filter assemblies used for preparing (filtering) liquids include a filter housing that defines a cylindrical interior that contains a filter membrane that removes impurities from a liquid that passes through the membrane. In use, liquid is caused to flow through the interior in a flow path that includes flow through the filter membrane. The filter membrane may be a component of a replaceable filter cartridge that can be removed from the housing and cleaned or replaced after a period of use. In other products, a filter membrane is a component of a disposable filter cartridge.

One typical installed arrangement of this type of filter apparatus is a system that includes a replaceable filter cartridge contained for use within a two-piece housing. The housing includes a housing manifold connected to a removable "bowl" that contains the replaceable cartridge. The manifold is connected to an input conduit and an output conduit. The input conduit is connected to the manifold inlet, which directs an incoming flow of unfiltered liquid into the housing. The output conduit is connected to the manifold outlet to receive a flow of fluid (i.e., a "filtrate") that exits the assembly through the manifold output after the fluid has passed through the filter membrane. During use, the fluid passes into the input, through the filter contained within the bowl, and then passes out of the filter housing through the outlet. After an amount of use, the bowl can be separated from the manifold and the filter can be removed and replaced with a new filter, or a filter that has been previously used and processed by a cleaning step.

A different typical installed arrangement is with a disposable filter assembly that includes a non-replaceable filter cartridge contained within the disposable filter housing. The housing has an inlet at one end of the housing and an outlet at an opposite end of the housing. An input conduit is connected to the inlet and an output conduit is connected to the outlet. Fluid flows into the inlet, through the assembly, including through the filter membrane, and then leaves the disposable housing through the outlet.

In these filtering systems, a filter cartridge design should maximize flow rates. This can be achieved by centering the filter cartridge within a filter housing during use, with a central longitudinal axis of the filter cartridge (and associated filter membrane) being aligned (substantially) with a central longitudinal axis of the filter housing (e.g., two-piece manifold and bowl housing, or a disposable cylindrical housing) and/or design the shape of the cartridge supports to minimize masking of the filter membrane. In some embodiments, the location of the cartridge should be in the middle of the filter housing (i.e., centered) with the outside surfaces of the filter membrane reasonably spaced from interior surfaces of the housing to allow for a designed level of fluid between the membrane and the filter housing interior surfaces. For example, a flow of fluid should be uniform through this space, at all locations around the perimeter of the filter cartridge and filter membrane. In some embodiments, the shape of the cartridge support minimizes masking (the surface area of the membrane covered by the cartridge support) and thereby improves flow distribution to avoid slow or dead flow spots within the filter cartridge.

Various structures and techniques have previously been used for centering a filter cartridge within a filter housing. Example structures have involved structures located at an end of a filter cartridge, such as a surface that is designed to engage an opposed surface of a manifold, or an adjacent surface of a cylindrical housing. These structures maintain a position of the filter cartridge relative to interior surfaces of a housing by engaging the housing generally at one or both ends of the filter cartridge. However, there is a continuing need for design improvements for both centering and improving flow.

SUMMARY

New structures of filter cartridges are described. These include cartridge supports that have a helical strand that can be useful for reducing masking and improving flow, centering surfaces at peripheral locations of the cartridge that can be useful to position a filter cartridge centrally within an interior volume of a filter housing, or both a helical strand and centering surfaces.

A cartridge support of this description can include centering surfaces that can be useful to affect and maintain a position of a filter cartridge and an associated filter membrane within an interior volume of a bowl of a filter housing, including maintaining a position of a filter cartridge in a centered position relative to interior surfaces of the bowl that surround a filter membrane of the filter cartridge. These centering surfaces can be located at outer (peripheral) surfaces of the cartridge support at a region of maximum (outermost) radial distance of surfaces of the cartridge outer support from a longitudinal axis of the cartridge.

Centering surfaces may be formed at peripheral locations of a cartridge support. In some embodiments, the cartridge support can be a cartridge outer support located between a filter housing and a membrane. In other embodiments, the cartridge support can be a cartridge inner support (or core) around which the membrane is positioned. The centering surfaces may be any size and shape, but generally have a low surface area relative to the area of the filter membrane so that the centering surfaces do not obstruct the flow of fluid through the filter membrane.

By certain non-limiting examples, centering surfaces may be formed as part of a cartridge support by adjusting a thickness of the cartridge support along a length, or by adjusting a width of the cartridge support along the length. Examples of structures that include a centering surface include longitudinal structures (strands, bars, which may be helical or non-helical) that have varying thickness along a length of the structure. Other examples include three-dimensional extension structures of an outer surface of a cartridge support, example structures including three-dimensional bumps, ridges, pyramids, or other protrusion that include an outermost surface that functions as a centering surface.

A cartridge support that includes centering surfaces can result in good flow properties of a fluid, e.g., a liquid fluid, through a housing space on a housing side of a filter cartridge. The structures of a support structure, which may include longitudinal structures such as a bar or a helical strand, can be used to form a cartridge support that exhibits a low coverage area or masking of the membrane, e.g., a large open space through which fluid may flow.

In one aspect, the disclosure relates to a filter cartridge. The filter cartridge includes: a cartridge distal end and a cartridge proximal end, a cartridge support that extends between the cartridge distal end and the cartridge proximal end and comprising a helical strand. The helical strand includes: a length that extends along a helical path of the helical strand, a thickness in a radial direction, a width that is perpendicular to the length and to the thickness, with the thickness varying along the length. In another aspect, the disclosure relates to a filter cartridge. The filter cartridge includes: a cartridge distal end and a cartridge proximal end, a cartridge outer support that extends between the cartridge distal end and the cartridge proximal end and comprising a helical strand. The helical strand includes: a length that extends along a helical path of the helical strand, a thickness in a radial direction, and a width that is perpendicular to the length and to the thickness. The helical strand has a ratio of width to thickness in a range from 1:3 to 3:1.

In another aspect, the disclosure relates to a filtering apparatus. The filtering apparatus includes: a filter housing comprising a cylindrical interior defined by a cylindrical sidewall and a filter cartridge disposed at the cylindrical interior. The filter cartridge includes: a cartridge distal end and a cartridge proximal end, and a cylindrical cartridge support that extends between the cartridge distal end and the cartridge proximal end, the cartridge outer support comprising surfaces that are located not more than 6 millimeters from the cylindrical sidewalls.

BRIEF DESCRIPTION OF THE DRAWINGS

FIGS. 1A, 1B, and 1C show a perspective view, top view, and an enlarged view of an example cartridge support and centering surfaces.

FIGS. 2A, 2B, 2C, and 2D show an example cartridge support and a method of the present description.

Figure 2A:
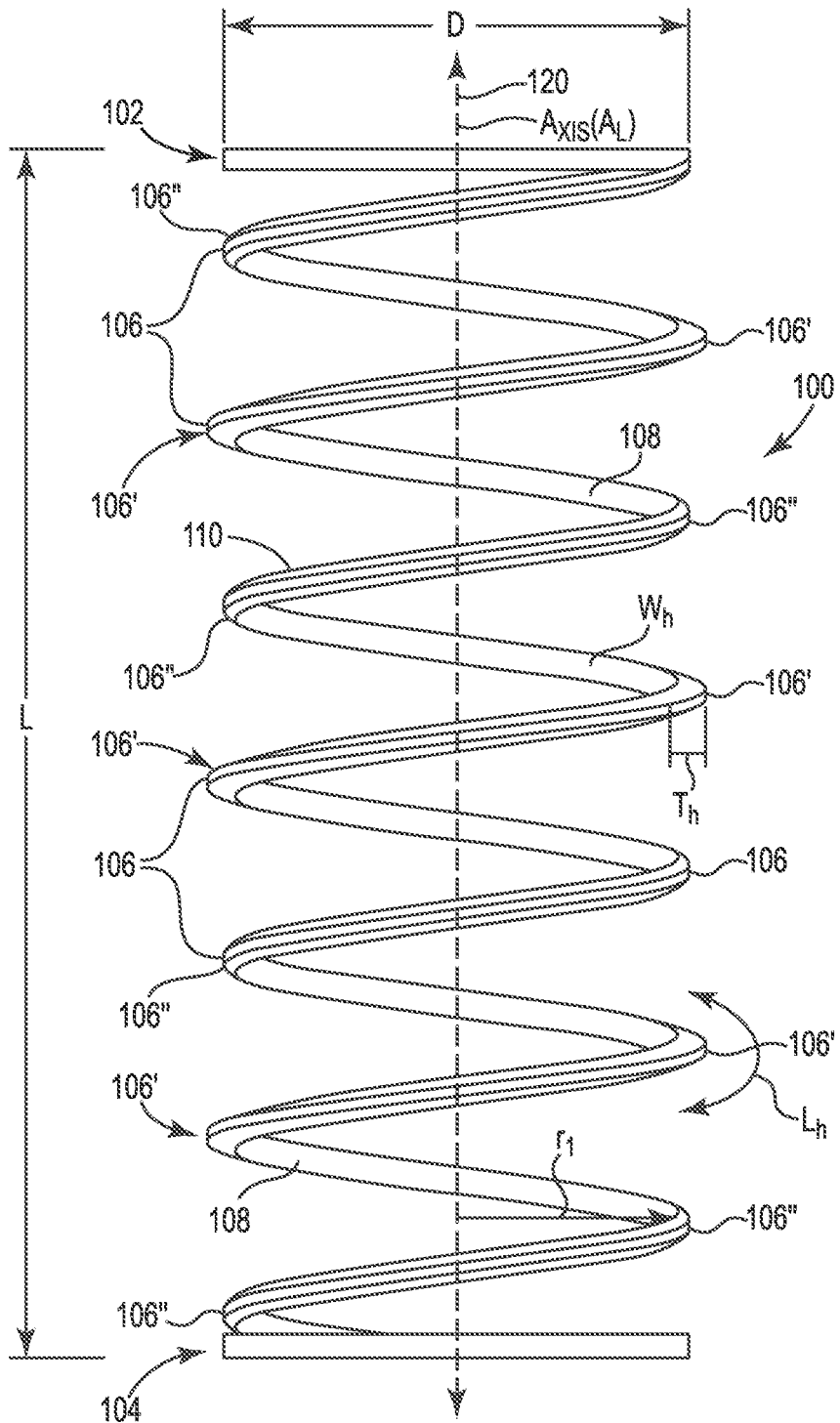

The figures are schematic and not necessarily drawn to scale.

DETAILED DESCRIPTION

The following description relates to novel and inventive filter cartridges, filter apparatuses that include a filter cartridge, and methods of preparing and using the filter cartridges and apparatuses. The filter cartridge includes a cartridge support. In certain examples, inventive filter cartridges include surfaces referred to as "centering surfaces" that are located at outer regions of the cartridge support to maintain a position of the filter cartridge at a centered location relative to an interior volume of a filter housing. In other examples, the cartridge support includes a helical strand.

A filtering apparatus as described is of a type that includes a housing (sometimes referred to as a "filter housing") that contains a filter cartridge that includes a filter membrane at an interior of the housing. The housing also includes an inlet, an outlet, and is designed so that a flow of fluid that enters the inlet will flow through the membrane and then exit the housing through the outlet.

One example of a useful filtering apparatus includes a cylindrical housing with a cylindrical interior, an inlet at one end, and an outlet at a second (opposite) end. This type of apparatus is often disposable, being designed for a period of use for filtering a fluid but not for regeneration or replacement of the filter cartridge or filter membrane within the housing. The ends of the apparatus are not typically removable, and the filter cartridge is not otherwise removable or replaceable from the interior of the housing. The housing can include a cylindrical, hollow "sleeve" portion that has an interior space that contains a filter cartridge. The housing also includes two ends, one at each end of the sleeve, with each end closing one of the two ends of the sleeve. The housing includes an inlet at one end, an outlet at the opposite end, and is designed to cause a flow of fluid that enters the inlet to flow through the membrane and then exit the housing through the outlet.

An example of a different type of a filtering apparatus includes a housing that can be opened and closed to allow for removal and replacement of a filter cartridge from within the housing after a period of use. A specific design can include a two-part structure that includes a "manifold" and a "bowl," with the manifold and bowl being separate structure that can be assembled together to contain a filter cartridge. The bowl has a structure that includes an open end and a distal end opposite of the open end. A sidewall extends from the open end to the distal end and includes interior sidewall surfaces that define an interior volume that extends between the open end and the distal end. The "open" end refers to an end that includes an aperture or opening through which a filter cartridge can pass when the bowl is separated from the manifold, to allow the filter cartridge to be placed within the interior or removed from the interior.

The distal end is substantially closed but may optionally include one or multiple optional vent passages through the distal end, which can be opened, e.g., selectively, to an exterior.

The filter housing also includes a manifold that opposes and engages the open end of the bowl to form a liquid-tight seal between the open end of the bowl and the manifold. The engagement may include a threaded engagement, a gasket, a clamp, or any other mechanical fastening device that will provide a liquid-tight seal between the manifold and the open end of the bowl, that seal being referred to herein as the "manifold-bowl seal."

When engaged with the open end of the bowl, the manifold covers the open end of the bowl to fill and close the opening and to cover the interior of the bowl, while the bowl contains the filter cartridge. The bowl communicates with an exterior space through openings or passages in the manifold in the form of an inlet and an outlet, each of which is part of the manifold structure. The manifold inlet allows fluid (e.g., unfiltered or pre-filtered liquid) to flow through the manifold from an exterior source and into an interior space of the housing, which may be either the "inner volume" located at an inner space of a filter membrane and filter cartridge, or a "housing volume" that is located at an outside of the filter membrane between an outer surface of the membrane and the bowl. The manifold outlet allows liquid to pass out of the housing, either from the inner volume to a location that is exterior to the housing, or from the housing volume to a location that is exterior to the housing.

The housing interior is configured to contain a filter cartridge that contains a filter membrane through which unfiltered liquid that enters the housing through the inlet will flow while passing through the filtering apparatus. The filter membrane can be any of a general class of filter membranes that are designed to fit within a bowl-type filter apparatus as described, within a bowl of the housing that engages a manifold, with the manifold having a single inlet and a single outlet arranged to cause fluid that enters the inlet to pass through the filter membrane before passing through the outlet.

These types of filter apparatuses can be configured to be used on a "bowl-up" orientation or a "bowl-down" orientation, as desired. In a bowl-up configuration the bowl is located above the manifold. In a bowl-down configuration the bowl is located below the manifold.

Filter membranes useful in these types of apparatuses generally are cylindrical (tubular, pleated tubular, wound) in shape, with a cylindrical outer surface, a cylindrical inner surface, and an inner space ("inner volume") that extends along a length of the membrane between the two ends of the cylindrical membrane. The membrane may be a sheet that is formed to a pleated, folded, or wound configuration to produce a hollow cylindrical form. The filter membrane may include a polymeric or a non-polymeric (e.g., fibrous) material that is sufficiently porous to allow a fluid (especially a liquid) to pass through the filter membrane. When the fluid passes through the membrane, particles or contaminants that are contained in the fluid can remain in the filter, which causes the particles or contaminants to be removed from the fluid.

A filter cartridge as described can include a filter membrane contained and held by support structure that is adapted to contain and support the filter membrane in a manner that allows the filter cartridge to be installed within a filter housing in a position and manner to cause a flow of fluid that passes through the filter housing, between an inlet and an outlet of the filter housing, to pass through the filter membrane. The filter cartridge contains a cartridge outer support at a cylindrical outside surface of the filter membrane, with the cartridge outer support including inner surfaces that face and optionally contact an outer surface of the filter membrane. The filter cartridge can also contain a cartridge inner support (sometimes referred to as a "core") that is located at an inner space defined by and facing a cylindrical inner surface of the filter membrane. The filter cartridge can also contain support in the form of "ends" or "end caps" at two opposed ends of the filter cartridge, including a proximal end (or "filter cartridge proximal end") and a distal end (or "filter cartridge distal end").

The filter cartridge can be considered to include a central longitudinal axis that extends along the length of the filter cartridge, along a center or medial location, between the two opposed ends of the filter cartridge. The filter cartridge defines an "inner volume" at the central interior of the annular or cylindrical filter cartridge on a core side of the filter membrane. The inner volume extends between the two opposed ends of the filter cartridge on the inner side of the cylindrical filter membrane and includes the longitudinal axis of the filter membrane.

The filter cartridge includes a second side relative to the filter membrane and the filter cartridge, sometimes referred to as a "housing side," which is opposite of the core side, and which faces the outer surface of the filter membrane and filter cartridge. The housing side of the filter cartridge also faces an interior surface of a bowl of a filter housing when the filter cartridge is installed in an assembled filter housing. The filter cartridge and housing assembly together define a second open space and volume within the assembled housing, on the housing side of the filter membrane, which is referred to as the "housing volume." The housing volume is located between the interior surfaces of the housing bowl, and the housing side of the filter cartridge, and is connected to one of the housing inlet or the housing outlet (typically the inlet).

The filter cartridge proximal end is configured to engage the manifold and to produce a liquid-tight seal between the manifold and the filter cartridge proximal end, i.e., a "filter cartridge-manifold seal." The filter cartridge-manifold seal provides a liquid-tight flow path between the inner volume and the manifold, to allow fluid (e.g., liquid) to flow between the inner volume and the manifold and through the housing inlet or the housing outlet. The filter cartridge-manifold seal can be of any useful design that will provide a sealed flow path between the manifold and the filter cartridge proximal end. Examples include threaded engagements, snap-fit engagements, and press-engagements.

The filter cartridge distal end is configured to engage an interior surface of the bowl, at the distal end of the bowl, to produce a liquid-tight seal between the bowl and the filter cartridge distal end, i.e., a "filter cartridge-bowl seal." The filter cartridge-bowl seal is located between the distal end of the bowl and the distal end of the cartridge and forms a seal at a distal region of the housing volume. A filter cartridge-bowl seal can be of any useful design that will provide a liquid-tight seal at a distal end of the housing volume, at surfaces of the bowl distal end and the filter cartridge distal end. Examples include opposed threaded engagements, snap-fit engagements, and press-fit engagements.

The cartridge support is made of a rigid material that will be substantially inert to fluid that passes through the filter housing and filter membrane during use. The cartridge support is self-supporting, meaning that when separated from a filter membrane, or before being engaged with a filter membrane, the cartridge support is sufficiently rigid and strong to support the weight of the cartridge outer support and substantially maintain its shape. The cartridge support can be considered to exhibit a length in a length-wise direction between the two opposed ends, and a radius and a diameter that are perpendicular to the length and to a longitudinal axis. See FIGS. 1A and 2A.

In some embodiments, the cartridge support is a cartridge outer support (sometimes referred to as a "cage") that is located at an outer position of the filter membrane. The cartridge outer support includes an inner surface that faces radially inward toward the longitudinal axis, and that optionally and preferably contacts an outer surface of the filter membrane when the filter membrane is placed within the cartridge outer support. Examples of useful or preferred cartridge outer supports can be flexible and can be compressible in a direction along the length of the cartridge outer support, along the longitudinal axis. In examples of these embodiments, a compressible cartridge outer support can be compressed in the longitudinal direction, which may cause the diameter of the cartridge outer support to increase. See FIGS. 2A and 2B.

A cartridge support of this description may optionally include centering surfaces that can be useful to affect and maintain a position of a filter cartridge and an associated filter membrane within an interior volume of a filter housing, including maintaining a position of a filter cartridge in a centered position relative to interior surfaces of the filter housing. These "centering surfaces" are located at outer (peripheral) surfaces of the cartridge outer support at a region of maximum (outermost) radial distance of surfaces of the cartridge outer support from the longitudinal axis. The term "centering surface" refers to surfaces (on a cylinder) of the cartridge outer support that have a two-dimensional area based on a length and a width (one or both of which may be curved, as on a surface of a cylinder) at the periphery of the cylindrical cartridge outer support. Also as used herein, a "centering surface" can refer to one or more point or line structures that are located at the peripheral surfaces at maximum radial distances from a longitudinal axis, which theoretically do not have an area based on a width and a length but can alone or in combination function as centering surfaces that maintain a position of a filter cartridge relative to an inner surface of a filter housing.

Centering surfaces may be formed at peripheral locations of a cartridge support (either a cartridge outer support or a cartridge inner support), in any form, shape, or size.

In certain examples, centering surfaces are formed by adjusting a thickness of the cartridge support along a length, width, or both. In certain examples, a thickness may vary gradually over an extended length of an outer support portion or may instead vary abruptly over a short length of the cartridge support. Example centering surfaces may be surfaces of a structure that have a varied thickness over a length of a strand (e.g., a helical strand) of an outer support portion that extends over a substantial length of a cartridge support. For example, a thickness may vary from a thickness maximum (at a centering surface) to a thickness minimum, over a length of 1 centimeter, or from 1 to 2, 3, or 4 centimeters. A "strand" is a portion of a cartridge outer support that has a substantially small width relative to a much greater length, such as shown by a ratio of length to width of at least 5:1, e.g., at least 10:1. A "strand" may be in the form of an elongate helical strand, or an elongate "bar" or other elongate structure of a cartridge outer support that has a substantially greater length relative to a width. In some embodiments, helical strands have a trapezoidal, triangular, rounded, square, or rectangular cross-section at locations along the length.

Other example centering surfaces may be located at outer surfaces of a strand, but do not require the strand to be varied in thickness or width. The strand may be uniform in thickness and width along the entire length of the strand. The strand may be helical or non-helical.

Other example centering surfaces may be located at surfaces of multiple discrete, individual three-dimensional extension structures that extend in a thickness direction from a portion of the cartridge support that has a discretely different and thinner thickness, e.g., from a bar or a strand having an elongate form and a flat outer surface. These three-dimensional extension structures may be in the form of multiple protrusions, bumps, length-wise-extending ridges or teeth, or other three-dimensional structures, extending from an otherwise flat surface of a cartridge outer support. The three-dimensional structure will include a point or a line or a surface that functions as a centering surface.

When assembled for use, a filter cartridge is preferably centered within the interior space of a filter housing (e.g., a bowl or a sleeve), meaning that the central longitudinal axis of the filter cartridge (and associated filter membrane) is aligned (substantially) with the central longitudinal axis of the housing bowl or housing sleeve. Various structures and techniques have been previously used for centering a filter cartridge within an interior volume of a filter housing. These structures may be at an end of the filter cartridge at a location to engage an opposing surface of a manifold, an end of a housing, or an interior surface of a housing. Example centering structures have been located at an inner (radially) portion of a filter cartridge, or at a peripheral location, such as a spacer disposed between an end cap of a filter cartridge and an interior surface of a filter housing. These types of centering mechanisms maintain a position of the filter cartridge relative to a manifold, bowl, end cap, or sleeve of a housing by contact between the cartridge end and a surface of the housing, generally at a location of an end of the filter cartridge.

According to the present description, a centering mechanism that maintains a position of the filter cartridge at a central location of an interior of a filter housing is based on "centering surfaces" that are located at peripheral regions of a cartridge outer support, e.g., at multiple locations around a circumference of the cartridge outer support and at multiple locations along the length of the cartridge support (between the proximal end and the distal end).

The centering surfaces can maintain a position of a filter cartridge within an interior volume of a cylindrical filter housing, relative to interior surfaces of the filter housing, generally to align a longitudinal axis of the filter housing with a longitudinal axis of the filter cartridge, i.e., to "center" the filter cartridge within the interior volume of the filter housing. With the filter cartridge positioned at the interior of the filter housing, the centering surfaces of the cartridge outer support are located near to, but optionally and preferably not in contact with, interior surfaces of the filter housing. The centering surfaces are located at multiple locations along the length of the cartridge outer support, and at multiple locations around the circumference of the cartridge support, typically in a dispersed, regular, non-random pattern or arrangement that is designed to allow for a useful flow of fluid through the housing volume, in combination with contact between the centering surfaces and interior surfaces at multiple (e.g., uniformly-spaced) circumferential portions of the filter cartridge and, continuously or regularly (e.g., uniformly-spaced) along a substantial portion of the length of the filter cartridge.

In example filter assemblies, with a filter cartridge situated and centered within an interior space of a bowl or sleeve of a filter housing, a distance between multiple or all centering surfaces and an adjacent interior surface of the filter housing can be small, without the centering surfaces contacting the interior surface. Multiple or all centering surfaces may be located a distance from an interior surface that is less than 6 millimeters, such as in a range from 0.5 to 5 millimeters, e.g., from 1 to 4 millimeters.

The centering surfaces can have any useful size, shape, and form relative to the cartridge support. Example centering surfaces may be flat (having a length and width, as defined relative to a cylindrical surface); linear (which includes helical), such as a line formed along a length of a centering surface; or pointed, such as at an apex of a pyramid, bump, cone, ridge, protrusion, or other three-dimensional structure that extends radially from a surface of the cartridge outer support. Centering surfaces may be continuous along an entire length of a cartridge support surface, e.g., along an entire length of an outer surface of a strand or another structure, for example a thickness of a strand can be uniform along an entire length of the strand and along an entire length of an outer support surface, and the outer surface of the strand can function as centering surfaces. Alternatively, centering surfaces may be intermittently and optionally regularly placed and evenly spaced along a length of the outer support surface (e.g., a strand), and may be a result of a varied thickness of a strand along a length of the strand, a varied thickness of a strand along the width of the strand, or both.

One feature of centering surfaces of a cartridge support is a total surface area of the centering surfaces, meaning a total surface area of centering surfaces when the outer surface is viewed from a side and perpendicularly toward an outside-facing surface of the cartridge support, over the entire area, defined by circumference and length of the cartridge support.

Surface area of centering surfaces can be measured relative to a total surface area of an imaginary cylinder ("centering surface cylinder") defined by the centering surfaces of a cartridge support. As used herein, a total amount of surface area that is made up by centering surfaces is presented as a percentage, calculated as a total area of centering surfaces of a cartridge outer support divided by a total area of an imaginary cylinder (referred to as a "centering surface cylinder") that intersects outermost surfaces (most distal surface based on a radial distance from the longitudinal axis—which also means the centering surfaces) of the cartridge outer support.

An example of a cartridge support that includes centering surfaces thereon, and a centering surface cylinder, are shown at FIGS. 1A (side perspective view), 1B (end view), and 1C (close up). The cartridge support shown in FIGS. 1A, 1B, and 1C may be used as a cartridge outer support or a cartridge inner support. The illustrated end portion of cylindrical outer support 10 includes a first end and longitudinal bars (or "strands") 14 that extend along a length of cartridge support 10 between the first end and an opposite end (not shown). Multiple three-dimensional extensions (bumps, protrusions, etc.) 18 are formed on flat (cylindrically curved) surfaces 16 of bars 14. Extensions 18 are arranged in a pattern, at regular intervals, over surfaces of bars 14. Each extension 18 has an outermost surface 20, which functions as a centering surface. Preferably, the outermost surfaces 20 of all of the multiple three-dimensional extensions 18 are located at substantially the same radial distance from longitudinal axis $A_L$, which extends longitudinally along a centerline of cylindrical cartridge outer support 10.

FIG. 1B shows the portion of cartridge support 10 of FIG. 1A from an end view. As illustrated, "centering surface cylinder" 30 is an imaginary cylinder located along a length of the cartridge outer support and at a constant radial distance $D_r$ from the longitudinal axis $A_L$ of cartridge outer support 10. Radial distance $D_r$ is equal to a distance between the longitudinal axis of the cartridge support and outermost surfaces of centering surfaces 20 of the cartridge support ("outermost" meaning a surface that is farthest radially from the longitudinal axis).

As illustrated, centering surfaces 20 are point structures that do not exhibit a substantial length, width, or area. Centering "surfaces" may include such point (dimensionless) structures of a three-dimensional extension of a cartridge outer support, as well as line structures that theoretically do not have both length and width dimensions. These "surfaces" intersect the centering surface cylinder at a single point or along a line. In other examples, centering surfaces of can be flat (cylindrically curved, optionally along a helical path) outer surfaces that extend along and intersect with a length and a width of the centering surface cylinder, such that the centering surfaces exhibits a length and width dimension (on a cylinder).

Centering surfaces can have a total surface area and be located at locations of a cartridge outer support to allow the centering surfaces to be effective at maintaining a position of the filter cartridge at a center of a filter housing (e.g., a bowl or sleeve), while still allowing a useful rate of fluid flow through the housing volume. The cartridge outer support and associated centering surfaces are located within the space of the housing volume of an assembled filter housing (within space located between inner surfaces of a filter housing and outer surfaces of a filter membrane). During use, fluid flows through the housing volume, which means that the cartridge outer support and the centering surfaces will be in the path of the flow of fluid and have the potential to impede the flow of fluid. Preferably, the shapes and sizes of the cartridge support and the centering surfaces of the cartridge outer support can be designed to control, reduce, or minimize an effect that the centering surfaces may have of impeding fluid flow through the housing volume, and to allow a useful amount of fluid flow through the housing volume.

Additionally or alternatively, centering surfaces of cartridge support portions may preferably have a relatively small total surface area. According to certain useful examples of cartridge supports, a total surface area of centering structures may be less than 30 percent of an area of a centering surface cylinder as defined. In other useful or preferred examples, total surface area of centering surfaces may be much less, such as less than 25, 20, 15, 10, or 5 percent of an area of a centering surface cylinder.

Additionally or alternatively, as an effective approximation of these ranges of areas of centering surfaces relative to a centering surface cylinder, centering surfaces may have comparable area relative to a cylindrical outer surface of a filter membrane of a filter cartridge. According to certain useful examples of cartridge outer supports, a total surface area of centering surfaces relative to a total outer (cylindrical) surface area of a filter membrane may be less than 30, 25, 20, 15, or 10 percent of a surface area of the outer surface of a filter membrane over which the cartridge outer support is located. The surface area of the filter membrane is the area of a cylinder that contacts peripheral surfaces of the filter membrane. The surface area of the filter membrane will be a surface area of a cylinder of uniform-radius (from a longitudinal axis of the filter cartridge), along a length of a filter membrane, with the radius being slightly less than (by the thickness of the outer support structure) the radius $D_r$ of a centering surface cylinder.

Some types of centering surfaces will exhibit a flat area that has a length and a width over a cylindrical surface. For these types of centering surfaces, total surface area is equal to the area of the flat surface.

Other centering surfaces may exhibit a rounded or pointed outer surface that does not have both a width and a length dimension. For these types of centering surfaces, a missing length or width dimension can be estimated as a small value, such as a length or width in a range from 0.5 to 1.5 millimeters, for the purpose of calculating total surface area of the centering surfaces. A centering surface in the form of a pointed ridge that forms a straight or curved line along a length of a cartridge support, having a length dimension but theoretically no width dimension, can be considered to have length equal to the length of the line, a nominal width in a range from 0.5 to 1.5 millimeters, and a surface area that is calculated as the width multiplied by the length. A centering surface in the form of a pointed or curved tip of a bump or protrusion, that is theoretically a dimension-less point structure, can be considered to have a nominal width in a range from 0.5 to 1.5 millimeters, a nominal length in a range from 0.5 to 1.5 millimeters, and a surface area calculated as the 0.5 to 1.5 millimeter length multiplied by the 0.5 to 1.5 millimeter width.

Also to facilitate fluid flow through a filter membrane and through a housing volume of a filtering apparatus, a cartridge support may include a reduced area of structures (e.g., strands such as bars or helical strands) that cause resistance to the flow of fluid through the housing volume or through the filter medium. A cartridge support that contains helical strands or lengthwise strands (bars) can facilitate flow of fluid through the housing volume by reducing masking/covering of the filter surface by the cartridge support.

A cartridge support can be designed to cover a reduced amount of area of an outer surface of a filter membrane supported by the cartridge support. An amount of the surface area of a filter membrane that is covered by (not necessarily in contact with) a cartridge support is referred to herein as a "coverage area." According to certain useful examples of cartridge supports, a total surface area of a cartridge support relative to a total outer (cylindrical) surface area of a filter membrane, may be less than 40, 30, 25, 20, 15, 10, or 5 percent of a surface area of the outer surface of a filter membrane over which the cartridge support is located.

Figure 5:
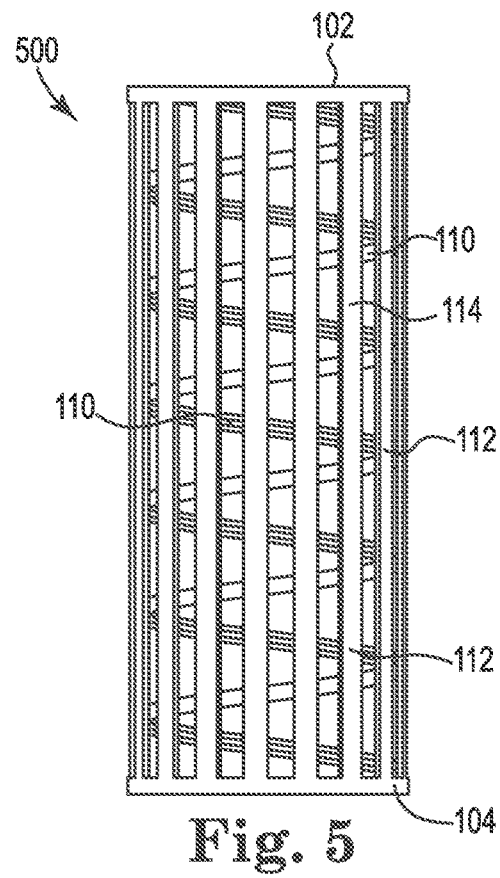

This "coverage area" may be equal to an area of contact between the cartridge support structure and a surface of a filter membrane or may be an area of contact between the cartridge support structure and a surface of the filter membrane that is less than the "coverage area" (e.g., see FIG. 5). According to certain useful examples of cartridge outer supports, an area of contact between the outer cartridge support and the surface of a filter membrane may be less than 40, 30, 25, 20, 15, 10, or 5 percent of a surface area of a filter membrane over which the cartridge support is located.

The cartridge support can be of any useful thickness, with preferred thicknesses being relatively thin, to reduce the level of flow resistance of liquid through the housing volume that is caused by the cartridge support. While exemplary cartridge may optionally have outer supports can have variable thicknesses, to provide centering surfaces, generally useful thicknesses of a cartridge support, or portions of a cartridge support, can be in a range of from 0.5 to 15 millimeters, e.g., from 1 to 5, 10, or 15 millimeters.

Also generally, a ratio of a width and a thickness of a strand of cartridge support may be in a range from 1:3 to 3:1 or from 1:2 to 2:1 (width:thickness), such as for a helical strand. For a longitudinal bar-type of a strand, a ratio of width to thickness can also be in a range from 1:3 to 3:1 or from 1:2 to 2:1, but may also be a ratio that reflects a higher width to thickness, such as a ratio of width to thickness in a range from 2:1 to 10:1 (width:thickness).

Example cartridge supports of the present description are now described with reference to some of the attached figures.

Referring to FIGS. 2A and 2B, illustrated is an example of a cartridge support 100. Cartridge support 100 includes distal end 102 and proximal end 104, with a single helical strand 110 extending along a length L of the cartridge support between two ends 102 and 104. Helical strand 110 has a length ($L_h$) that extends along a helical path defined by the strand between end 102 and end 104. Helical strand 110 also, as illustrated, has a variable thickness ($T_h$) that extends in a radial direction between an outer surface 106 and inner surface 108. Helical strand 110 has a width ($W_h$) that extends in a direction that is transverse to both the length ($L_h$) and the thickness ($T_h$).

Helical strand 110 includes two-dimensional (curved over a cylindrical form) inner surface 108 that faces inwardly toward longitudinal axis 120 and extends along the entire length ($L_h$) of the helical stand. As illustrated, inner surface 108 is referred to as a "flat" (two-dimensional) surface relative to the cylindrical form defined by inner surface 108 along the length of the outer support surface. Inner surface 108 has a helically-extending length, and a width that is transverse to the thickness and to the length, and that is located at a constant radius ($r_i$) from longitudinal axis 120. Outer surface 106 is a two-dimensional surface that has a relatively constant width, and a length that extends along the entire length of helical strand 110.

Portions of outer surface 106 are centering surfaces as described. Helical strand 110 has a thickness ($T_h$) that varies along the length of the strand. At some locations along the length the thickness ($T_h$) is greater than at other locations along the length of helical strand 110. At the thicker locations, designated 106', helical strand 110 has a maximum thickness and outer surface 106' is located at an outermost (maximum radius) location of cartridge outer support 100. Surfaces 106', therefore, are centering surfaces as described herein. Portions of helical strand 110 that have a reduced or minimum thickness are designated surfaces 106".

While shown to exhibit a variable thickness, helical strand 110 does not require a variable thickness along any of its length and may instead have a uniform thickness along any portion of its length or along the entire helical length ($L_h$). In that form, the outer surface 106 along the entire length $L_h$ of uniform-thickness helical strand 110 may be considered to be a centering surface.

As shown at FIG. 2B, cartridge support 100 is compressible along longitudinal axis 120. The compressibility is particularly useful when cartridge support 100 acts as a cartridge outer support that surrounds a filter as it facilitates placing the cartridge support 100 around the filter. FIG. 2B shows cartridge support 100 compressed to exhibit a reduced length L' and an increased diameter D'.

FIGS. 2B, 2C, and 2D illustrate steps of example methods of assembling a filter cartridge by a step of compressing a compressible cartridge support 100 (FIG. 2B), inserting filter membrane 116 into the inner space of the compressed cartridge support (FIG. 2C), and then removing the compression (FIG. 2D). The assembled filter cartridge of FIG. 2D includes un-compressed cartridge support 110 positioned on an outer surface of the filter membrane.

Figure 3A:
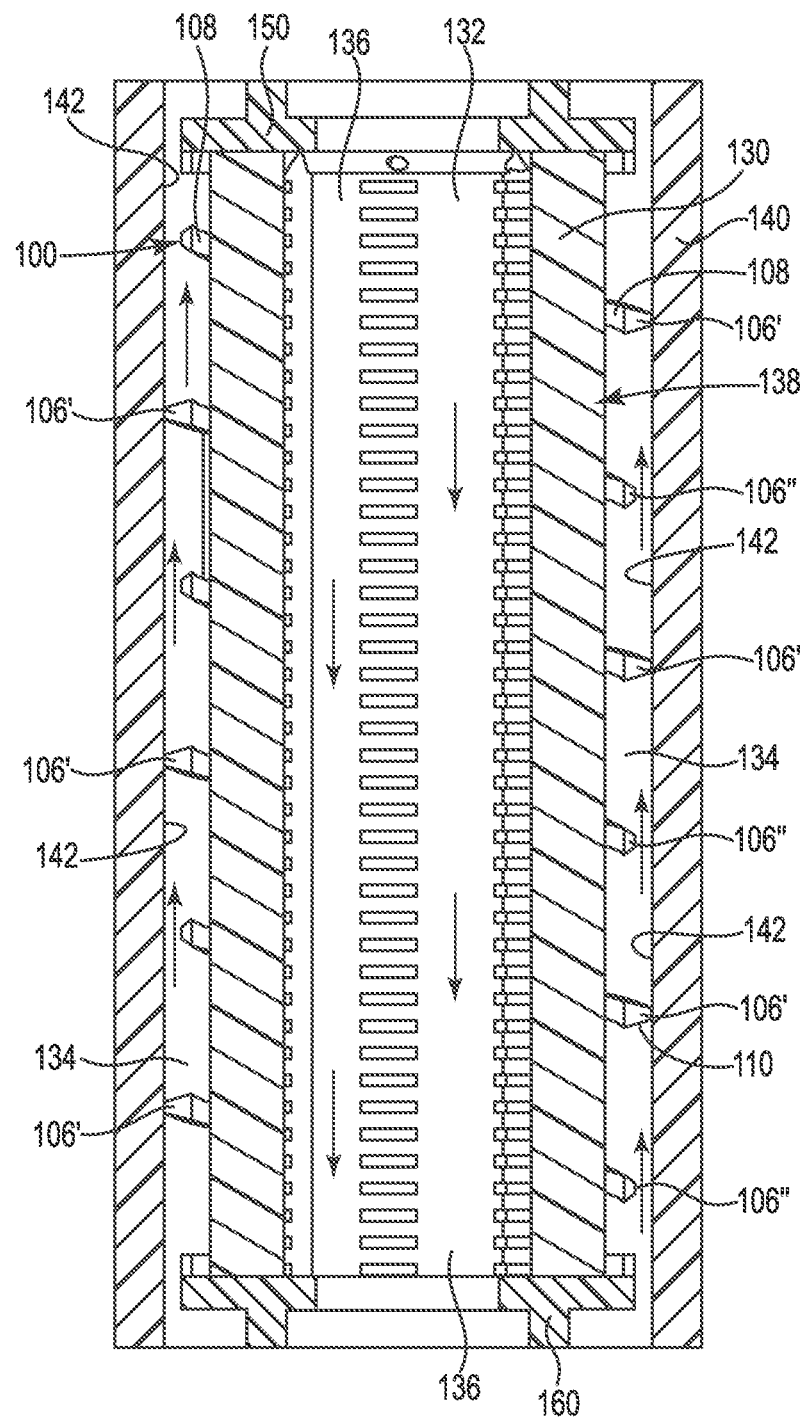
FIGS. 3A and 3B are schematic views of filter apparatuses and filter cartridges, as described.

Regarding cartridge support 100 of FIG. 2A, the helical path and the (optional) varied thickness of helical strand 110 to form centering surfaces 106', with these features either taken individually or in combination, allow for useful or advantageous flow performance of fluid relative to cartridge support 100 contained in a housing volume. Referring to FIG. 3A, cartridge support 100 is included as a cartridge outer support as a component of a filter cartridge 138 that includes filter membrane 130, distal end cap 150, proximal end cap 160, and cartridge inner support (or "core") 132. While cartridge support 100 as shown as the cartridge outer support in FIG. 3A, any of the other cartridge supports disclosed herein can act as the cartridge outer support (for example cartridge support 400 shown in FIG. 4, cartridge support 500 shown in FIG. 5, and cartridge support 600 shown in FIG. 6). In some embodiments, cartridge inner support 132 can be one of the cartridge supports disclosed herein, such as cartridge support shown in FIGS. 4 and 5. As shown, filter cartridge 138 is installed within bowl 140 of a filter housing, with cartridge 138 centered within bowl 140. In use, fluid (indicated by arrows) can flow from an inlet (not shown) into housing volume 134, then through filter membrane 130, to inner volume 136, and then through an outlet (not shown) to exit the filter housing.

Still referring to FIG. 3A, inner surfaces 108 of cartridge support 100 are located adjacent to, preferably but not necessarily in contact with, outer surfaces of filter membrane 130. Cartridge support 100 is located within housing volume 134. Outer surfaces 106', functioning as centering surfaces, can be located a small distance (e.g., less than 6 millimeters) from inner surfaces 142 of bowl 140 of the illustrated filter housing. FIG. 3A shows contact between outer surfaces 106' and inner surface 142 of bowl 140, but a small distance of separation between the surfaces is preferred. FIG. 3A shows that helical strand 110 has a varying thickness along the helical length of the helical strand. Alternatively, helical strand 100 may have a uniform thickness along the helical length of the strand.

Cartridge support 100 is not an undue impediment to flow of fluid through housing volume 134, because the helical shape of cartridge support 100 allows liquid to flow through the spaces between helically-wound strand 110, along the entire length of cartridge support 100, without the flow of fluid being blocked in a width direction by any portion of the structure of cartridge support 100. Additionally, the (optional) reduced thicknesses of other portions of helical strand 100 (designated 106") create separation between a portion of the total amount of outer surfaces 106 of helical strand 100, and interior surface 142 of housing bowl 140, creating space for fluid to flow between portions of outer surface 106 of helical strand 110 and interior surface 142 of housing bowl 140.

Figure 3B:
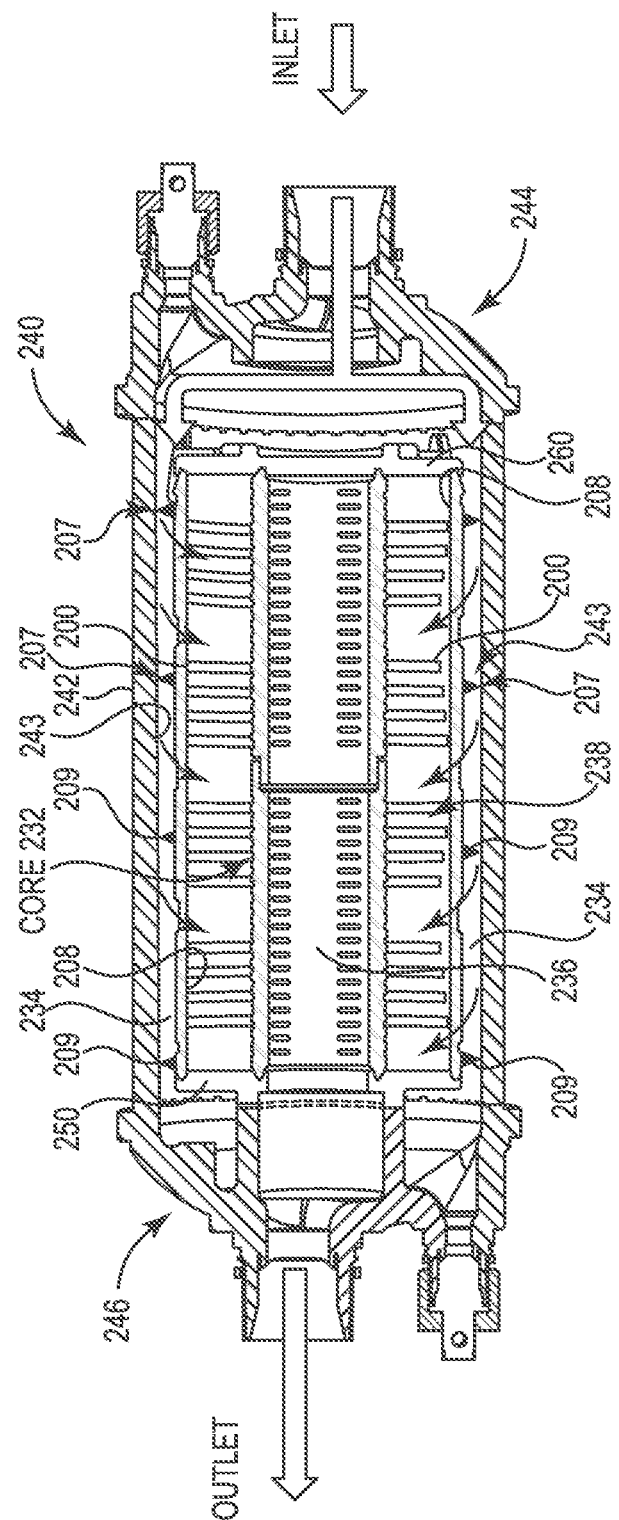

Referring to FIG. 3B, cartridge support 200 is included as a cartridge outer support component of a filter cartridge 238 that includes a filter membrane (not shown), distal end cap 250, proximal end cap 260, and cartridge inner support structure (or "core") 232. As shown, filter cartridge 238 is installed within filter housing 240 which includes sleeve 242, a first (inlet) end 244, and a second (outlet) end 246. Cartridge 238 is centered within sleeve 242 between ends 244 and 246, and relative to the cylindrical interior surface 243 of sleeve 242.

In use, fluid (indicated by arrows) can flow from an inlet located at inlet end 244, into housing volume 234, then through the filter membrane (not shown) of cartridge 238, to inner volume 236, and then through an outlet as part of outlet end 246, to exit filter housing 240.

Still referring to FIG. 3B, inner surfaces 208 of cartridge support 200 are located adjacent to, preferably but not necessarily in contact with, outer surfaces of a filter membrane. Cartridge support 200 is located within housing volume 234. Outer surfaces 207 at ends of extensions 209, which extend radially from an outer surface of cartridge outer support 200, function as centering surfaces. Outer surfaces 207 can be located a small distance (e.g., less than 6 millimeters) from inner surfaces 243 of sleeve 240 of the illustrated filter housing. FIG. 3B shows contact or near contact between outer surfaces 207 and inner surface 243 of sleeve 242, and a small distance of separation between the surfaces is preferred.

Figure 4:
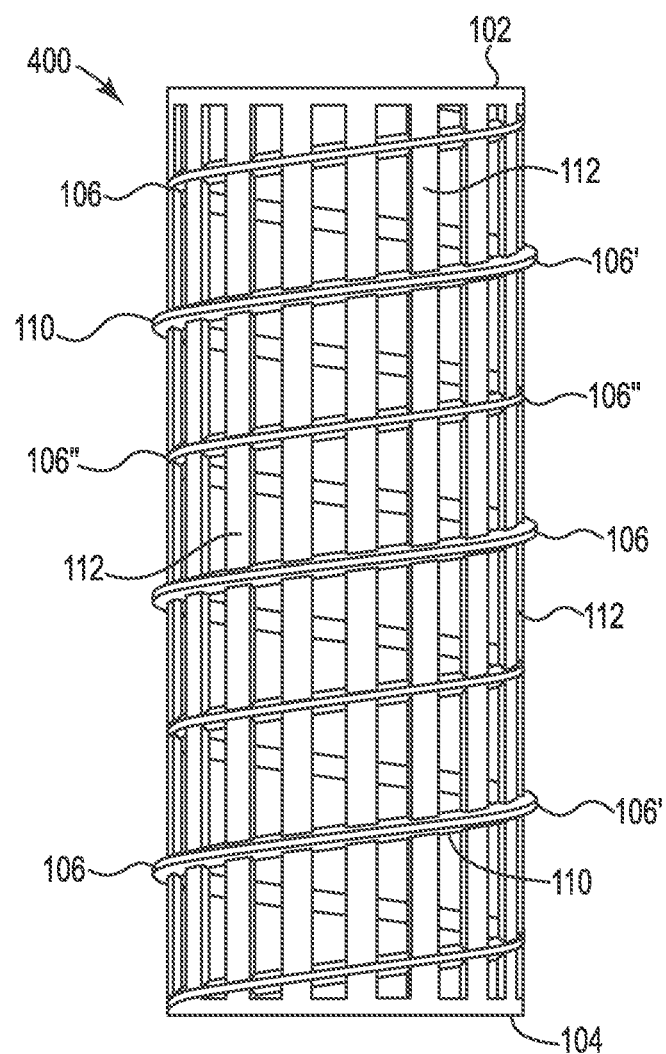
FIGS. 4 through 6 are side view illustrations of cartridge supports of the present description.

In an alternative embodiment of a cartridge support as described, FIG. 4 shows cartridge support 400, which includes ends 102 and 104 and helical strand 110, as in the example of FIG. 2A. Additionally, cartridge support 400 of FIG. 4 includes a set of longitudinally-extending strands or bars 112. Additionally, helical strand 110 is located at an outer portion of cartridge support 400, which places centering surfaces 106' at outermost peripheral locations of cartridge outer support 100. FIG. 4 shows that helical strand 110 has a varying thickness along the helical length of the helical strand. Alternatively, helical strand 110 may have a uniform thickness along the helical length of the strand. Cartridge support 400 shown in FIG. 4 can act as a cartridge outer support or a cartridge inner support. In some embodiments longitudinally-extending strands or bars 112 can have multiple three-dimensional extensions similar to those disclosed with respect to FIG. 1A.

In an alternative embodiment of a cartridge support as described, FIG. 5 shows cartridge support 500, which includes ends 102 and 104 and helical strand 110, as in the example of FIG. 2A. Additionally, cartridge support 500 of FIG. 5 includes a set of longitudinally-extending strands (or "bars" 112). Helical strand 110 is located at an inside location of cartridge support 100. Centering surfaces, which are optional and not shown, may be placed at outermost peripheral locations of cartridge outer support 100, e.g., as protrusions or extensions from flat (cylindrically two-dimensional) outer surfaces 114 of bars 112. An advantage of cartridge support 500 is the low amount of surface area of inner surfaces 120 of helical strand 110 that contacts an outer surface of a filter membrane (not shown) held within cartridge outer support 100. With a low amount of surface area contact between helical strand 110 and the outer surface of the filter membrane, a very small amount of flow from the membrane is directly blocked by a surface of cartridge outer support 100. FIG. 5 shows that helical strand 110 has a varying thickness along the helical length of the helical strand. Alternatively, helical strand 110 may have a uniform thickness along the helical length of the strand. The cartridge support 500 shown in FIG. 5 can act as a cartridge outer support or a cartridge inner support. In some embodiments longitudinally-extending strands or bars 112 can have multiple three-dimensional extensions similar to those disclosed with respect to FIG. 1A.

Figure 6:
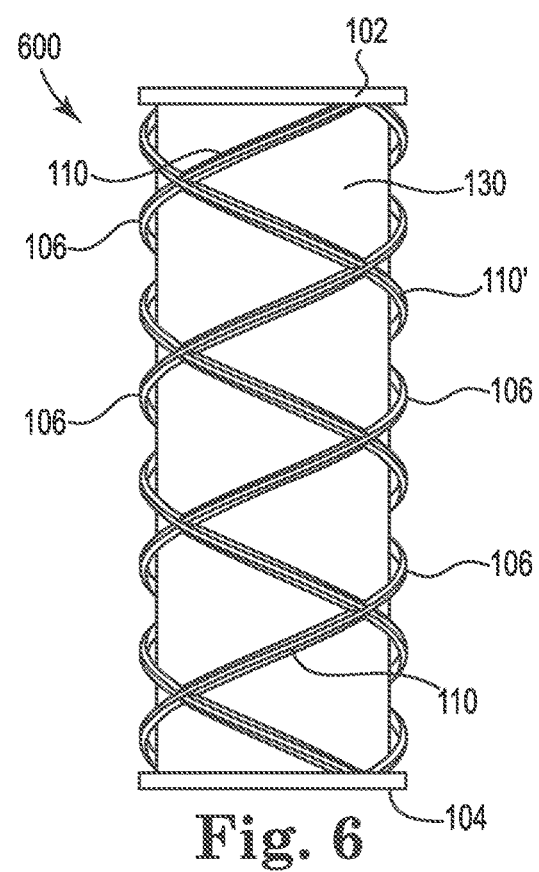

In yet a different embodiment of a cartridge support as described, FIG. 6 shows an alternative cartridge support 600. Cartridge support 600 includes ends 102 and 104, as in the example of FIG. 2A. Additionally, cartridge support 600 of FIG. 6 includes a set of two counter-rotating helical strands 110, 110', each having centering surfaces (not shown) along outer surface 106. In some embodiments, there may be more than two counter-rotating helical strands. Cartridge support 600 of FIG. 6 may be compressible along longitudinal axis 120. Each of the two helical strands may, independently, have a uniform thickness along the helical length of the strand, or a non-uniform thickness along the length of the helical strand. The cartridge support 600 shown in FIG. 6 can act as a cartridge outer support or a cartridge inner support.

A cartridge support of the present description can be prepared from any useful material, with preferred materials being polymeric, especially thermoplastic polymers that can be reversibly solidified and melted by alternately heating and cooling the polymer. Preferred thermopolymers can be melted by heating, then cooled to a reduced temperature that will cause the thermopolymer to solidify to a cartridge outer support having a desired shape (e.g., helical with centering surfaces) that is sufficiently rigid and strong to be self-supporting, i.e., for the cartridge support to support its own weight with only minor deformation.

Examples of polymers useful for forming a cartridge support include thermoplastic polymers generally, with useful chemical types of thermoplastic polymers include polyolefins, such as polyethylene, polypropylene, and blends of these with other polyolefins or non-polyolefin thermopolymers; polyacrylates; polyurethanes; and thermoplastic fluoropolymers such as perfluoroalkoxy alkanes (PFA).

A polymeric material may be formed into a cartridge support by any useful technique for forming thermoplastic items, such as molding, injection molding, or three-dimensional printing techniques.

Generally, useful methods of forming a cartridge support and assembling the cartridge support to be placed at an outer surface of a filter membrane can include preparing the cartridge support separately from the filter membrane, then inserting the filter membrane into the inner space of the cartridge support when used as a cartridge outer support. The filter membrane may be inserted, with necessary force, into an end of the cartridge outer support and pushed to a position of the ends of the filter membrane being adjacent to the ends of the cartridge outer support. Optionally, as shown at FIGS. 2A through 2D, certain examples of cartridge outer supports that contain helical strands may be compressed to expand a diameter of the cartridge outer support, to facilitate a step of inserting the filter membrane into the cartridge outer support. In other embodiments, when the cartridge support acts as a cartridge inner support, the filter membrane may be placed around the cartridge support.

In a different example, a cartridge outer support may be prepared from a thermoplastic polymer by melting the thermoplastic polymer and applying the melted thermoplastic polymer to an outer surface of a filter membrane in a desired form, such as in a form of a single helical strand, multiple (e.g., opposed) helical strands, or other structures such as bars. The thermoplastic polymer may be applied to the surface by any technique, including optional molding to form centering surfaces. The thermopolymer may solidify to adhere to an outer surface of the filter membrane. Still, however, the solidified thermoplastic is sufficiently strong to support its own weight and not deform if removed from contact with the filter membrane, and the solidified thermoplastic cartridge outer support is considered to be self-supporting.

In a first aspect, a filter cartridge comprises a cartridge distal end and a cartridge proximal end, a cartridge support that extends between the cartridge distal end and the cartridge proximal end, and comprising a helical strand that includes: a length that extends along a helical path of the helical strand, a thickness in a radial direction, a width that is perpendicular to the length and to the thickness, and a ratio of width to thickness in a range from 1:3 to 3:1.

In a second aspect according to the first aspect, the filter cartridge being compressible along the longitudinal axis, wherein compressing the filter cartridge along the longitudinal axis causes the diameter to increase.

In a third aspect according to the first or second aspect, the helical strand comprising: a trapezoidal, triangular, rounded, square, or rectangular cross-section at locations along the length, a thickness that varies along the length, or both.

In a fourth aspect according to any of the preceding aspects, the filter cartridge further comprising a filter membrane that extends between the cartridge distal end and the cartridge proximal end.

In a fifth aspect according to any of the preceding aspects, wherein the cartridge support comprises a clockwise-rotating helical strand and a counter-clockwise-rotating helical strand.

In aسixth aspect according to any of the preceding aspects, comprising a filter membrane that extends between the cartridge distal end and the cartridge proximal end, the cartridge support having a surface area that covers less than 40 percent of a surface area of an outer surface of the filter membrane.

In a seventh aspect according to any of the preceding aspects, wherein the cartridge support is self-supporting.

In an eighth aspect according to any of the preceding aspects, wherein the cartridge support comprises thermoplastic polymer.

In a ninth aspect according to the eighth aspect, wherein the thermoplastic polymer comprises a polyolefin, a polyacrylate, a polyurethane, or a thermoplastic fluoropolymer.

In a tenth aspect, a filter cartridge comprises: a cartridge distal end and a cartridge proximal end, a cartridge support that extends between the cartridge distal end and the cartridge proximal end, and comprising a helical strand that includes: a length that extends along a helical path of the helical strand, a thickness in a radial direction, a width that is perpendicular to the length and to the thickness, the thickness varying along the length.

In an eleventh aspect according to the tenth aspect, the filter cartridge further comprising a filter membrane that extends between the cartridge distal end and the cartridge proximal end.

In a twelfth aspect according to the tenth or eleventh aspect, the helical strand comprising: a trapezoidal, triangular, rounded, square, or rectangular cross-section at locations along the length.

In a thirteenth aspect according to any one of the tenth through twelfth aspects, the cartridge support comprising: the helical strand, and elongate bars extending between the cartridge distal end and the cartridge proximal end.

In a fourteenth aspect according to any one of the tenth through thirteenth aspects, wherein the cartridge support comprises a clockwise-rotating helical strand and a counter-clockwise-rotating helical strand.

In a fifteenth aspect according to any one of the tenth through fourteenth aspects, further comprising a filter membrane that extends between the cartridge distal end and the cartridge proximal end, the cartridge support having a surface area that covers less than 40 percent of a surface area of an outer surface of the filter membrane.

In a sixteenth aspect according to any one of the tenth through fifteenth aspects, wherein the cartridge support is self-supporting.

In a seventeenth aspect according to any one of the tenth through sixteenth aspects, wherein the cartridge support comprises thermoplastic polymer.

In an eighteenth aspect according to any one of the tenth through seventeenth aspects, wherein the thermoplastic polymer comprises a polyolefin, a polyacrylate, a polyurethane, or a thermoplastic fluoropolymer.

In a nineteenth aspect according to any one of the tenth through eighteenth aspects, the helical strand having: a thickness in a range of 0.5 to 8 millimeters, a width in a range of 1 to 15 millimeters, or both.

In a twentieth aspect according to any one of the tenth through nineteenth aspects, the helical strand having a ratio of width to thickness in a range from 1:3 to 3:1.

In a twenty-first aspect, a method of assembling a filter cartridge of the first through twentieth aspects, the method comprising: compressing the cartridge support to cause a diameter of the cartridge support to increase, inserting a filter membrane into the cartridge support while the cartridge r support is compressed, and allowing the diameter of the cartridge support to decrease, and the cartridge outer support to contact an outer surface of the filter membrane.

In a twenty-second aspect, a method of preparing a filtering cartridge of any of the first through twentieth aspects, wherein the cartridge support comprises a thermoplastic polymer, the method comprising preparing the cartridge support by an additive manufacturing method.

In a twenty-third aspect, a method of preparing a filtering cartridge of any of the first through twentieth aspects, wherein the cartridge support comprises a thermoplastic polymer, the method comprising applying the thermoplastic polymer in a melted form directly to an outer surface of a filter medium and allowing the thermoplastic polymer to solidify on the outer surface of the filter medium.

In a twenty-fourth aspect a filtering apparatus comprises a filter housing comprising a cylindrical interior space, and a filter cartridge of any of the first through twentieth aspects within the cylindrical interior space.

In a twenty-fifth aspect according to a twenty-fourth aspect, wherein the filter cartridge comprises a filter membrane and wherein the cartridge support is an outer cartridge support that surrounds the filter membrane.

In a twenty-sixth aspect according to a twenty-fourth aspect, wherein the filter cartridge comprises a filter membrane and wherein the cartridge support is an inner cartridge support is positioned within the filter membrane.

In a twenty-seventh aspect, a filtering apparatus comprises a filter housing comprising a cylindrical interior defined by an open end, a distal end opposite of the open end, cylindrical sidewall surfaces that extend from the open end to the distal end and that comprise interior sidewall surfaces, and an interior that extends between the open end and the distal end, and a filter cartridge disposed at the interior, the filter cartridge comprising: a cartridge distal end and a cartridge proximal end, a cylindrical cartridge support that extends between the cartridge distal end and the cartridge proximal end, the cartridge support comprising surfaces that have three-dimensional extensions.

In a twenty-eight aspect according to the twenty-seventh aspect, wherein the surfaces of the cartridge support are located not more than 6 millimeters from the cylindrical sidewall.

In a twenty-ninth aspect according to the twenty-seventh or twenty-eighth aspect, wherein cartridge support comprises a longitudinally-extending strand from the cartridge distal end and the cartridge proximal end.

In a thirtieth aspect according to any one of the twenty-seventh through twenty-ninth aspects, the filter cartridge comprises a filter membrane and wherein the cylindrical cartridge support is an outer cartridge support that surrounds the filter membrane.

In a thirty-first aspect according to any one of the twenty-seventh through twenty-ninth aspects, the filter cartridge comprises a filter membrane and wherein the cylindrical cartridge support is an inner cartridge support is positioned within the filter membrane.

The invention claimed is:

1. A filter cartridge comprising:
a cartridge distal end and a cartridge proximal end,
a compressible cartridge support made of one or more of: polyacrylates and thermoplastic fluoropolymers including perfluoroalkoxy alkanes (PFA), wherein the cartridge support extends between the cartridge distal end and the cartridge proximal end, and the cartridge support comprising:
centering surfaces located at multiple locations of peripheral regions around a circumference of a cartridge outer surface and continuously along a length of the cartridge support between the cartridge distal end and the cartridge proximal end; and
a helical strand that includes:
a length of the helical strand that extends along a helical path of the helical strand,
a thickness of the helical strand in a radial direction, and
a width of the helical strand that is perpendicular to the length and to the thickness of the helical strand,
wherein a ratio of the width to the thickness of the helical strand is in a range from 1:3 to 3:1, the thickness varies along the length, or both,
wherein the centering surfaces maintain a position of the filter cartridge at a centered location relative to an interior volume of a filter housing.

2. The filter cartridge of claim 1, the filter cartridge being compressible along the longitudinal axis, wherein compressing the filter cartridge along the longitudinal axis causes a diameter to increase.

3. The filter cartridge of claim 1, the helical strand comprising:
a trapezoidal, triangular, rounded, square, or rectangular cross-section at locations along the length,
a thickness of the helical strand that varies along the length, or both.

4. The filter cartridge of claim 1, wherein the cartridge support comprises a clockwise-rotating helical strand and a counter-clockwise-rotating helical strand.

5. The filter cartridge of claim 1, comprising a filter membrane that extends between the cartridge distal end and the cartridge proximal end, the cartridge support having a surface area that covers less than 40 percent of a surface area of an outer surface of the filter membrane.

6. The filter cartridge of claim 1, wherein the cartridge support is a solidified thermoplastic cartridge support to be self-supporting to support its weight and maintain its shape.

7. The filter cartridge of claim 1, the cartridge support comprising:
the helical strand, and
elongate bars extending between the cartridge distal end and the cartridge proximal end.

8. The filter cartridge of claim 1, the helical strand having:
a thickness in a range of 0.5 to 8 millimeters,
a width in a range of 1 to 15 millimeters, or both.

9. A filtering apparatus comprising:
the filter housing having a cylindrical interior space, and
the filter cartridge of claim 1 within the cylindrical interior space.

10. The filtering apparatus of claim 9, wherein the filter cartridge comprises a filter membrane and wherein the cartridge support is an outer cartridge support that surrounds the filter membrane.

11. The filtering apparatus of claim 10, wherein
the filter housing comprises a cylindrical interior defined by an open end, a distal end opposite of the open end, cylindrical sidewall surfaces that extend from the open end to the distal end and that comprise interior sidewall surfaces, and an interior that extends between the open end and the distal end, and
wherein the outer cartridge support comprises surfaces that have three dimensional extensions, wherein the outer cartridge support is made of one or more of: polyacrylates and thermoplastic fluoropolymers including perfluoroalkoxy alkanes (PFA).

12. The filtering apparatus of claim 11, wherein the surfaces of the outer cartridge support are located not more than 6 millimeters from the cylindrical sidewall.

13. The filtering apparatus of claim 11, wherein the outer cartridge support comprises a longitudinally-extending strand from the cartridge distal end and the cartridge proximal end.

14. The filtering apparatus of claim 11, wherein the filter cartridge comprises a filter membrane and wherein the cylindrical cartridge support is an outer cartridge support that surrounds the filter membrane.

15. The filtering apparatus of claim 11, wherein the filter cartridge comprises a filter membrane and wherein the cylindrical cartridge support is an inner cartridge support positioned within the filter membrane.

* * * * *